United States Patent [19]

Buttarazzi

[11] Patent Number: 4,546,901
[45] Date of Patent: Oct. 15, 1985

[54] APPARATUS FOR DISPENSING MEDICATION

[76] Inventor: Patrick J. Buttarazzi, 4 Fitch Ave., Auburn, N.Y. 13021

[21] Appl. No.: 576,449

[22] Filed: Feb. 2, 1984

[51] Int. Cl.⁴ .............................................. B65B 57/20
[52] U.S. Cl. .................................... 221/10; 221/13; 221/25; 221/32; 221/71; 221/123; 221/210; 414/119; 414/280
[58] Field of Search ................... 221/2, 9–10, 221/13, 25–26, 30–32, 70–74, 123, 210; 414/280, 118–119

[56] References Cited

U.S. PATENT DOCUMENTS

| | | | |
|---|---|---|---|
| 3,394,798 | 7/1968 | Sako | 221/25 X |
| 3,556,342 | 1/1971 | Guarr | 221/2 |
| 3,780,907 | 12/1973 | Colburn et al. | 221/2 |
| 3,871,156 | 3/1975 | Koenig et al. | 221/2 X |
| 3,878,967 | 4/1975 | Joslin et al. | 221/123 |
| 3,917,045 | 11/1975 | Williams et al. | 221/71 X |

*Primary Examiner*—Charles A. Marmor
*Attorney, Agent, or Firm*—Bruns and Wall

[57] ABSTRACT

Medication dispensing apparatus for hospital and nursing home use that can satisfy patient prescription requirements on a large scale. The apparatus includes a carriage for dispensing pills or other medication required by the prescription of a particular patient on command from a computer control system. The pills are automatically selected from a large array of bins, deposited in an individual patient tray and delivered to an inspection station where verification of the prescription is achieved by comparing the tray contents with a display of patient data.

22 Claims, 10 Drawing Figures

APPARATUS FOR DISPENSING MEDICATION

BACKGROUND OF THE INVENTION

This invention relates generally to apparatus for dispensing medicinal substances on a large scale, and has special reference to a novel medication dispensing apparatus that is particularly adapted for hospital and nursing home use.

Apparatus and systems for automatically dispensing drug doses in response to programmed input information have been developed heretofore. Such an apparatus is disclosed in U.S. Pat. No. 3,917,045 granted Nov. 4, 1975 to Robert L. Williams et al, this patent representing the closest prior art known to the applicant. The Williams patent is directed to a drug dispensing apparatus for automatically dispensing one or more individual drug doses to a common collection area in accordance with input information representing the medicinal needs of a particular patient.

The apparatus disclosed in the Williams patent includes a locked cabinet which houses a relatively large number of removable and refillable cartridges. Each cartridge stores a plurality of individual identical drug doses and has means for sequentially dispensing the doses on a demand basis. The dispensing apparatus also includes means for receiving the input information and control means that responds to the input information and selectively operates the cartridges to dispense an individual drug dose or doses according to the patient's unique medicinal needs.

While the Williams apparatus undoubtedly serves its intended purpose, the construction is relatively complex and thus expensive to produce. In one of the main embodiments, for example, every one of the drug storage cartridges requires an electric motor, a sensor, a switch, indicator lamps and assorted pulleys and drive belts, and 81 such cartridges are shown. In the other main embodiment having at least as many cartridges, each cartridge is equipped with a solenoid and the necessary wiring therefor.

Additional prior art, developed in the course of a preliminary search, is disclosed in U.S. Pat. Nos. 3,144,958; 3,179,288; 3,196,276; 3,310,199; 3,312,372; 3,410,450; 3,436,736; 3,815,780; 3,848,112; 4,107,777; 4,223,801 and 4,237,536.

SUMMARY OF THE INVENTION

The present invention provides a medication dispensing apparatus for hospital and nursing home use that can satisfy patient prescription requirements on a large scale and at the same time is relatively economical to build and operate. The apparatus includes means for dispensing pills or other medication required by the prescription of a particular patient on command from a computer control system. The pills are automatically selected from a large array of bins, deposited in an individual patient tray and delivered to an inspection station where verification of the prescription is achieved by comparing the tray contents with a display of patient data.

The pills are mounted ten in a row on an elongated cardboard or paper strip and a plurality of the pill strips are mounted one above the other in each bin. The vertical side walls of the bins are formed with a series of opposed slots in which the opposite longitudinal edges of the pill strips are releasably received, the bins having no other mechanisms or components therein. The pills are obtained from the bins by a vertically movable carriage having gripping fingers that engage the front edge of a preselected pill strip and withdraw one or more pills from the bin. The pill or pills that have been withdrawn are severed from the pill strip by cutter blades also mounted on the carriage and the pills then drop down onto a conveyor belt that deposits them in the patient tray.

DESCRIPTION OF THE PREFERRED EMBODIMENT

IN GENERAL

Figure 1:
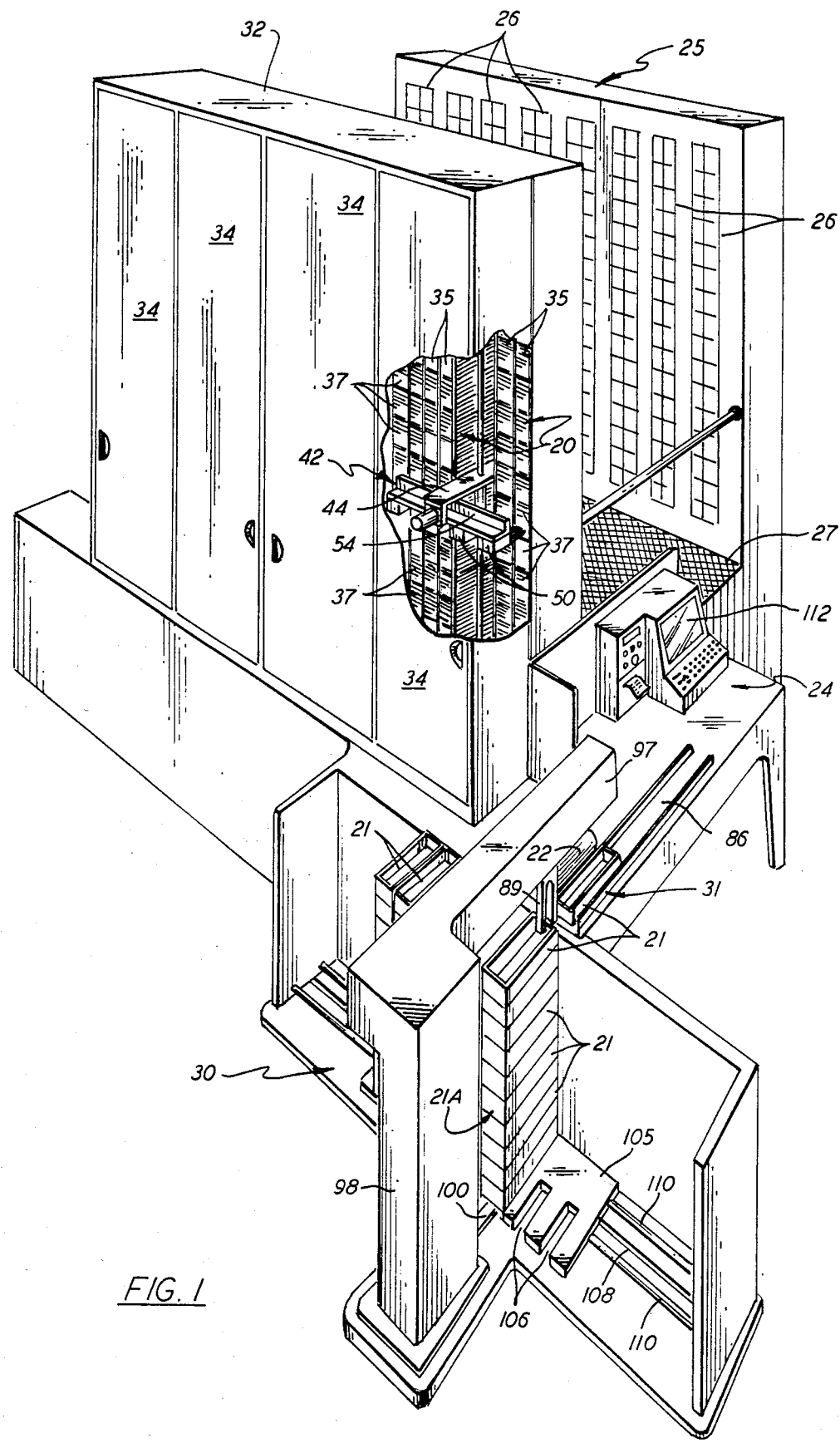
FIG. 1 is a perspective view of a medication dispensing apparatus embodying the invention.
Figure 3:
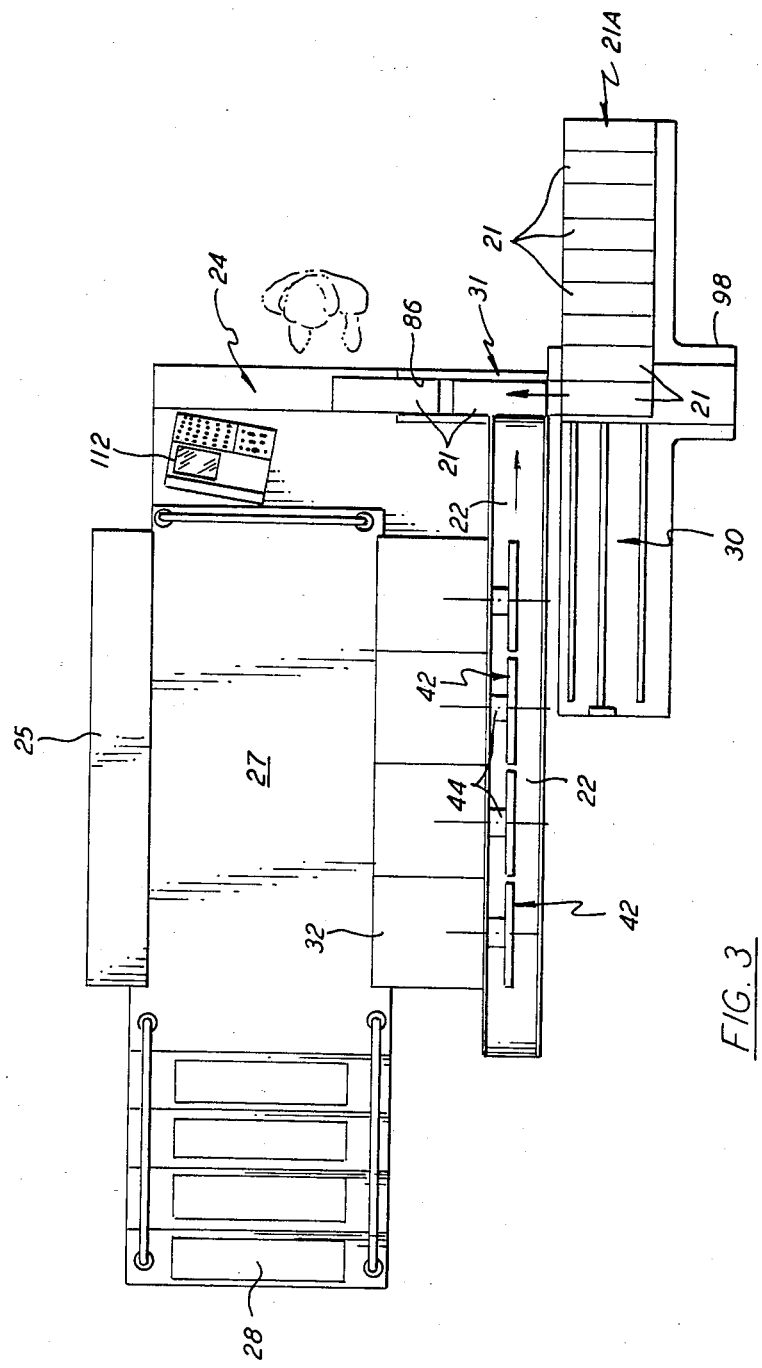
FIG. 3 is a top plan view of the apparatus of FIG. 1.

Having reference now to the drawings, and with particular reference to FIGS. 1 and 3, the medication dispensing apparatus of the invention is essentially comprised of a plurality of pill dispensing units 20, receptacles in the form of individual trays 21 in which the dispensed pills are deposited, a high speed conveyor belt 22 (FIG. 3) that transports the pills from the dispensing units to the trays, and an inspection station 24 to which the trays are delivered after receiving the pills. In this application, the terms "pill" and "medication unit" are used interchangeably and both terms mean a single dosage of medication that may be in the form of a pill or capsule, and a capsule may contain either a solid or a liquid.

Except for certain operations at the inspection station to be described, the operation of the dispensing apparatus is automatic and is controlled by a computer that is not per se a part of the invention. At the outset, the prescription requirements for all of the patients in the particular institution are key-punched or otherwise entered into the computer control system and thereafter the apparatus operates to dispense the medication required for each prescription on command from the control system.

The dispensing apparatus includes a medication supply area 25, FIG. 1, that has sixteen vertical storage racks 26 for storing a reserve supply of medication. Medication in the racks 26 is transferred as needed to the dispensing units 20 by an operator standing on an elevated platform or deck 27 accessible by stairs 28, FIGS. 3 and 4. A supply of the pill receiving trays 21 is stored in a storage area 30, FIG. 1, having means for moving successive trays upwardly to a point from which they are moved horizontally to a receiving station 31. At the receiving station the trays receive pills from the conveyor belt 22 and the trays are then moved to the inspection station 24. The means for moving the trays is described hereinafter.

PILL DISPENSING UNITS

Figure 4:
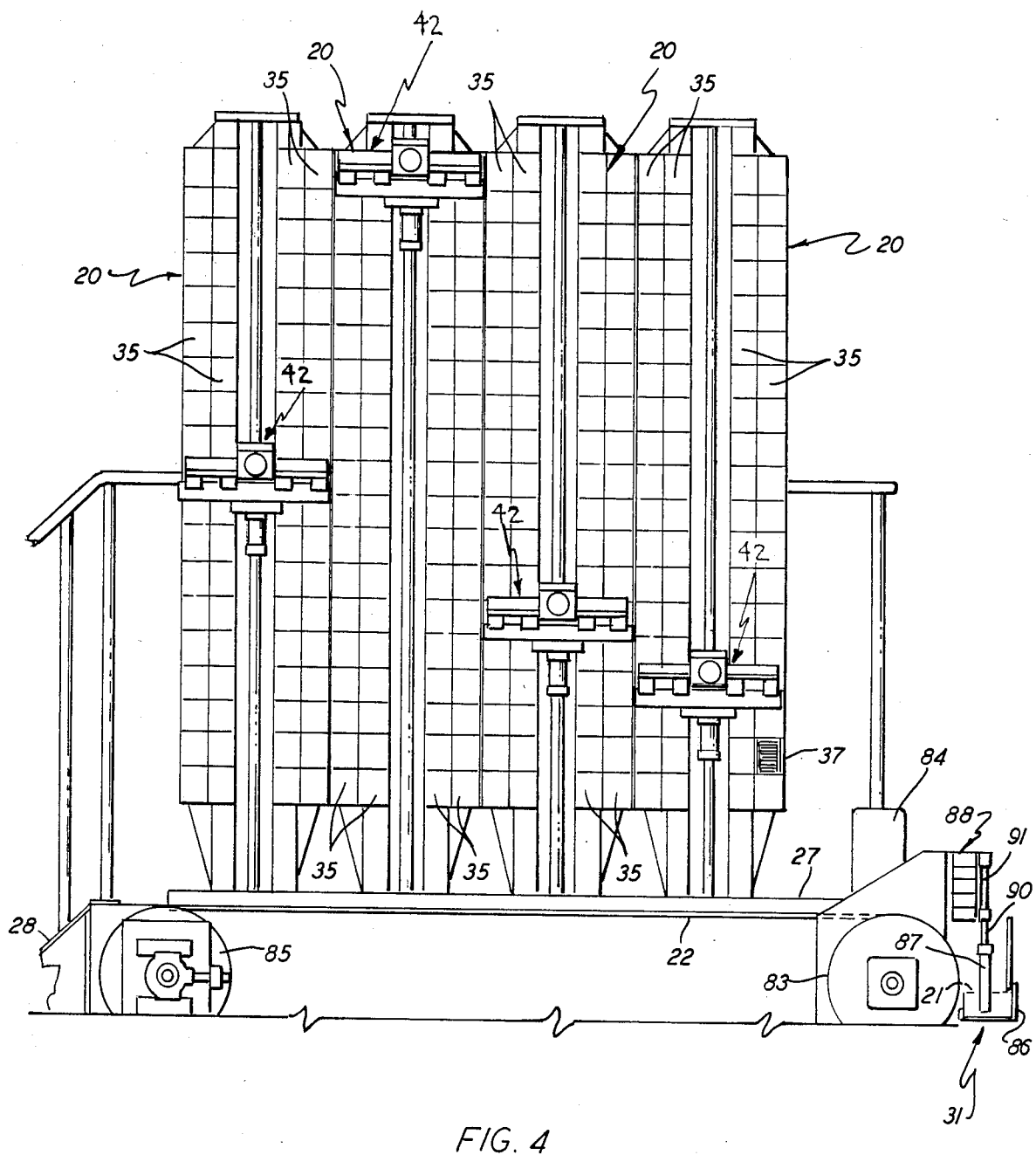
FIG. 4 is a front elevation of the dispensing units with the outer access doors removed.
Figure 9:
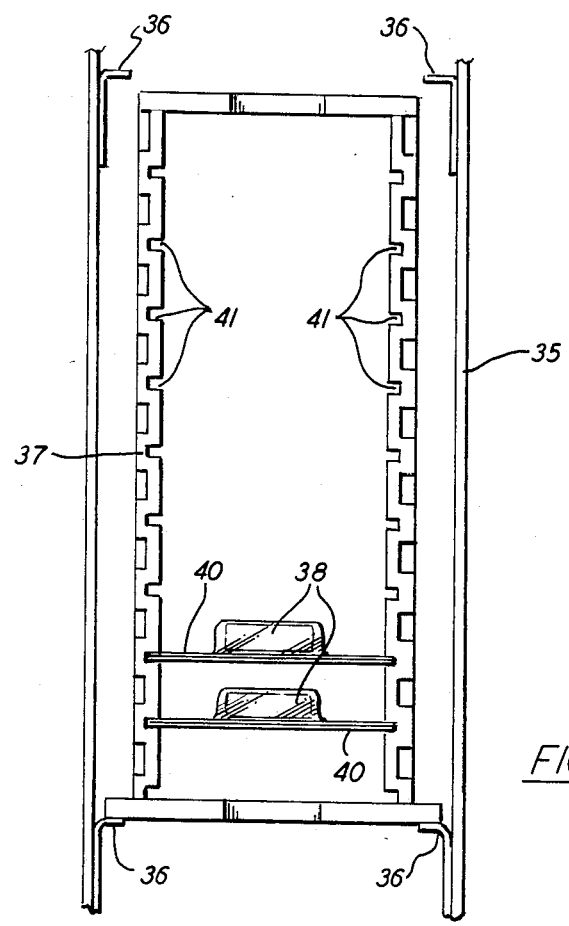
FIG. 9 is an enlarged front elevation of a storage bin for pill strips, the bin being positioned in a storage rack that is shown fragmentarily.

In the illustrated embodiment of the invention, there are four pill dispensing units 20, FIGS. 1 and 4, located in a cabinet 32 having access doors 34. Each unit 20 has four vertical racks 35 disposed in side by side relation with the second and third racks being spaced apart as shown for a purpose to be described. As best shown in FIG. 9, each rack 35 has a series of opposed brackets 36 for supporting a plurality of bins 37 one above the other, there being a stack of nineteen bins in each rack.

Figure 10:
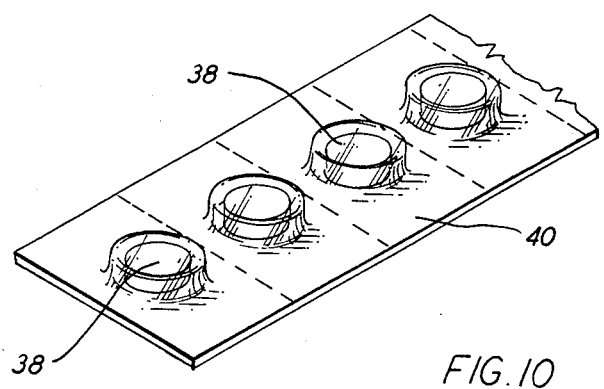
FIG. 10 is an enlarged, fragmentary perspective view of a pill strip.

The pills to be dispensed are shown at 38 in FIGS. 9 and 10. A row of the pills, usually ten in number, is mounted on an elongated strip 40 of cardboard or heavy paper that is stiff enough so that it will not buckle in the transverse direction. The pills, capsules or the like are held in position on the strip by any suitable means such as shrink packaging. The opposite longitudinal edges of the pill strips 40 are received with a sliding fit in opposed grooves 41 in the side walls of the bins 37, each bin being adapted to support ten pill strips as indicated in FIG. 9.

The pills 38 are dispensed from the vertical racks 35 in each dispensing unit 20 by a vertically movable carriage assembly indicated generally at 42 in FIGS. 1 and 4–8. Since the carriage assemblies are the same for all of the dispensing units, only one need be described. Carriage 42 includes an elongated, horizontally disposed main plate 44 a portion of which extends into the space between the second and third racks 35 of the dispensing unit 20 as best shown in FIGS. 1 and 4.

The carriage is moved up or down to a predetermined bin location on command from the control system. This is done by a ball screw drive activated by a conventional stepping motor (not shown). The ball screw drive is essentially comprised of a ball screw 45 and ball nut 46, FIGS. 5 and 7, the latter being secured to the underside of the carriage as shown. The ball screw drive coacts with guide rods 47, and these rods and the drive components are located in the space between the second and third racks.

The pill strips 40 are positioned in predetermined locations in their respective bins 37, and the bins in turn are positioned in predetermined locations in their respective racks 35. As a result of this strategic placement of the medication, the control system will know the precise location to which the carriage must be moved for dispensing the pills for a particular prescription.

Figure 5:
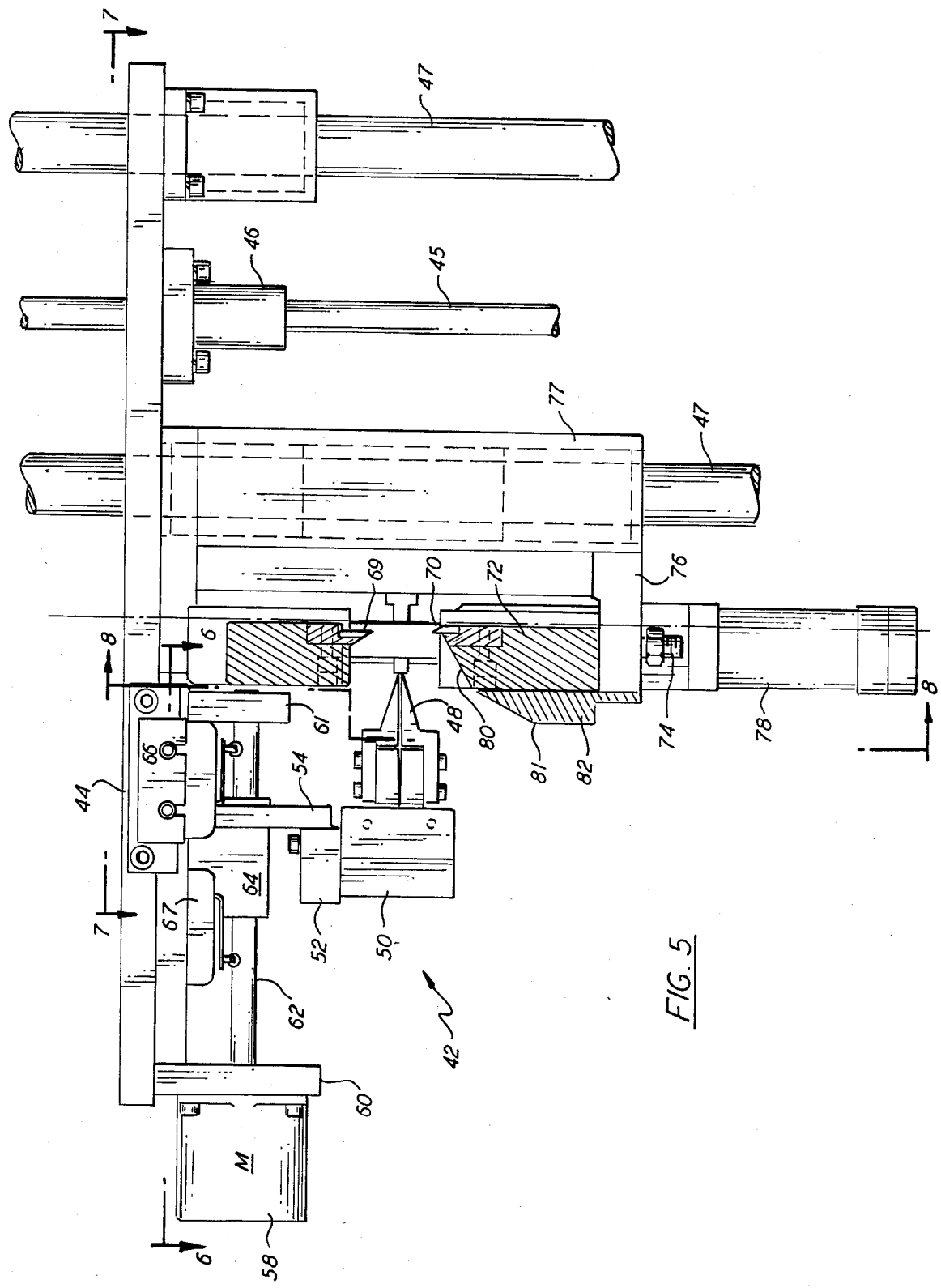
FIG. 5 is an enlarged side elevation, with parts in section, of a dispensing unit carriage assembly.
Figure 6:
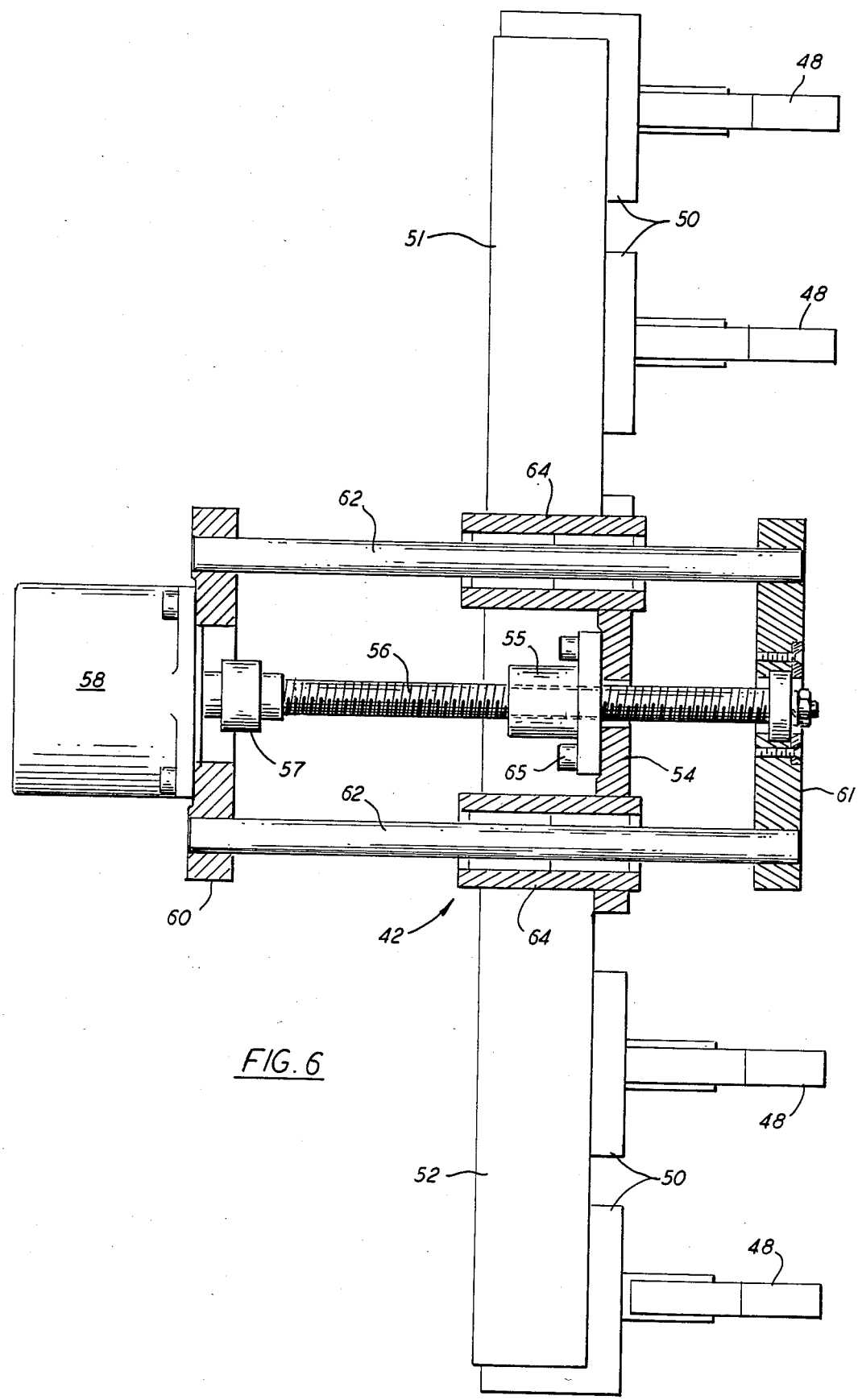
FIG. 6 is a horizontal sectional view taken on line 6—6 of FIG. 5.
Figure 7:
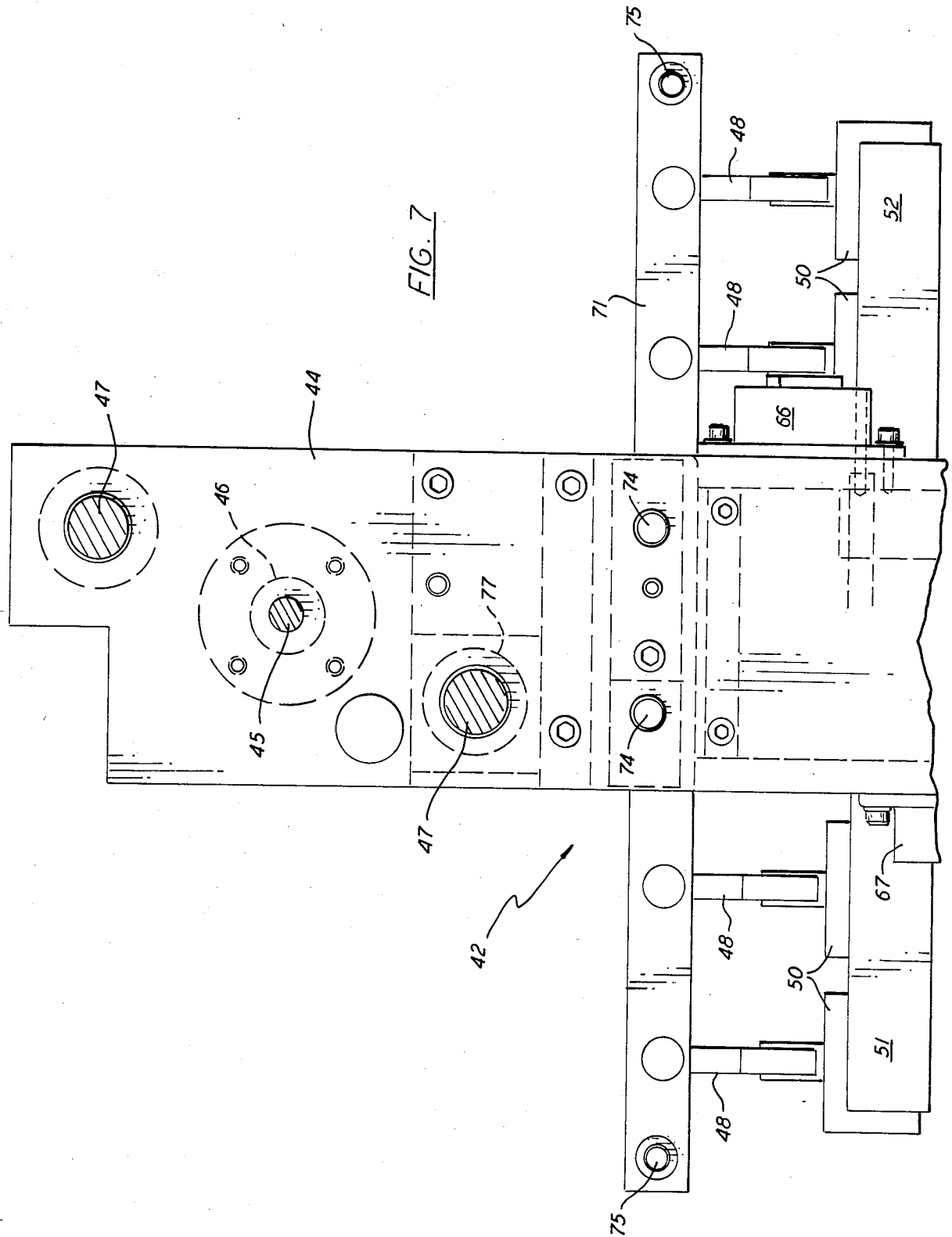
FIG. 7 is a fragmentary top plan view of the carriage assembly looking in the direction of arrows 7—7 of FIG. 5.

The pill strips are withdrawn from the bins by a pair of gripping fingers 48 supported by the carriage, FIGS. 5, 6 and 7, there being a pair of such fingers for each of the four racks in a dispensing unit. When the carriage is moved to a predetermined bin location on command, it is actually moved so that its gripping fingers are positioned in horizontal alignment with a preselected pill strip. Each pair of gripping fingers 48 is supported by and connected to a commercially available pick up head 50 such as is marketed by A. G. Russel. The gripping fingers can be moved horizontally towards and away from the pill strip bins 37 as will be described.

Two of the pick up heads 50, FIG. 6, are secured to a transverse bar 51 while the other two heads are secured to a transverse bar 52, the two bars being in longitudinal alignment with one another as shown. The bars 51,52 are both welded or otherwise secured to a transverse plate 54, FIGS. 5 and 6, that is in turn secured to a ball nut 55 in engagement with a ball screw 56. The screw 56 is connected through a coupling 57 to a stepping motor 58 which operates on command to rotate the screw and thus move the bars 51,52 and pick up heads 50 towards or away from the pill strip bins 37.

The stepping motor 58 is mounted on a transverse plate 60, FIGS. 5 and 6, that is secured to and depends from the underside of the carriage main plate 44. The end of the ball screw 56 opposite the motor is journalled in a transverse plate 61 that also depends from the underside of the carriage main plate. The plate 54 that supports the bars 51 and 52 is guided in its horizontal movement towards or away from the pill strip bins by horizontal guide rods 62, the opposite ends of the rods being supported by the transverse plates 60 and 61, respectively, as best shown in FIG. 6. The guide rods pass through guide sleeves 64 secured to the plate 54. This arrangement not only guides the horizontal movement of the bars 51,52 and gripping fingers 48 but also prevents rotation of ball nut 55 which is secured to the plate 54 as by bolts 65, FIG. 6.

The two pairs of gripping fingers 48 on bar 51 are aligned with the first and second racks 35 of a dispensing unit, while the gripping fingers 48 on bar 52 are aligned with the third and fourth racks. After the carriage has been moved to a predetermined bin location on command from the control system, the stepping motor 58 moves the ball nut 55 and thus all four pairs of gripping fingers 48 forward or towards the pill strip bins 37 until the front edges of the aligned pill strips extend a short distance into the space between the fingers, which are normally open as shown in FIG. 5. At that time, forward movement of the fingers stops and one or more of the pick up heads 50 receives a command to close its fingers so that the fingers grasp the edge of the pill strip therebetween. Thereafter, all of the fingers are moved in the opposite direction a predetermined distance whereby a predetermined number of pills on the strip that has been grasped are withdrawn from its bin. This strip is then cut by a cutting mechanism to be described whereupon the pills that have been withdrawn are severed from the remainder of the strip.

Movement of the pairs of gripping fingers towards the bins 37 for engagement with a selected pill strip is limited by the engagement of plate 54 with a limit switch 66, FIGS. 5 and 7, mounted on the carriage main plate 44. Movement of the gripping fingers in the opposite direction, after a selected pill strip has been withdrawn from its bin and one or more pills have been severed from it, is limited by the engagement of plate 54 with a limit switch 67 mounted on the main plate 44. Except when the gripping fingers are moved towards the bins to withdraw a pill strip, plate 54 is in engagement with switch 67 so that the gripping fingers do not interfere with the up and down movement of carriage assembly 42.

Figure 8:
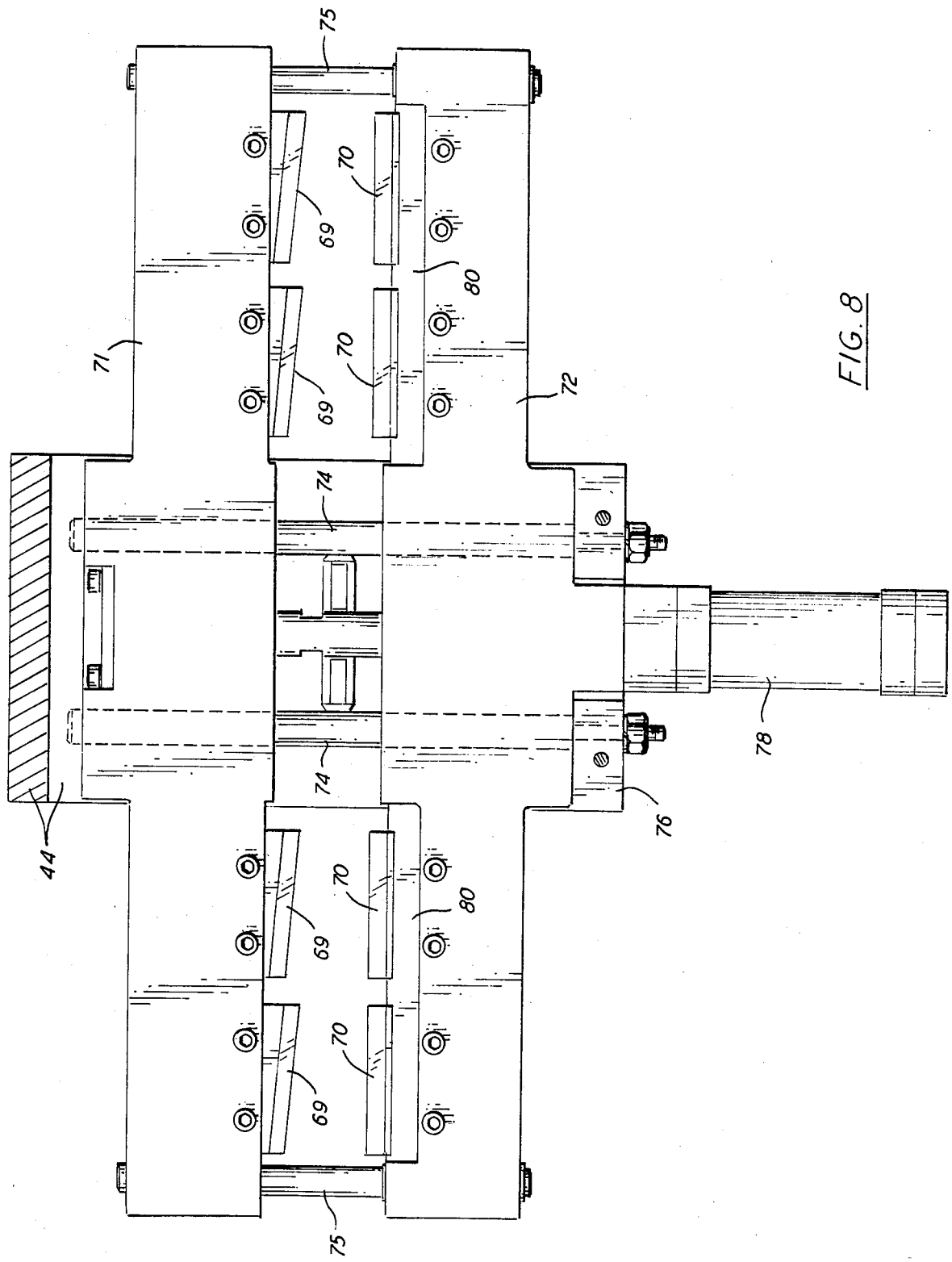
FIG. 8 is a side elevation of the carriage assembly cutting mechanism looking in the direction of arrows 8—8 of FIG. 5.

The cutting mechanism for each dispensing unit 20 includes four pairs of blades, FIGS. 5 and 8, each blade pair having an upper blade 69 and a lower blade 70. There is a blade pair for each of the four racks 35 in the dispensing unit, and the blade pairs are in vertical alignment with the respective pairs of gripping fingers for the racks. The blades are slightly wider than the pill strips 40, and are brought together with a shearing action to cut any strips that have been withdrawn from the bins 37.

The upper and lower blades 69, 70 are respectively carried by horizontal bars 71 and 72, FIG. 8, and these bars are guided for vertical sliding movement towards and away from one another by inner vertical guide rods 74 and outer vertical guide rods 75. The upper ends of the inner rods 74 are threaded into the carriage main plate 44 while the lower ends of these rods are secured to a U-shaped plate 76. As best shown in FIG. 5, plate 76 is secured as by welding to the bearing sleeve 77 for the outer carriage guide rod 47, the sleeve being fixed at its upper end to the carriage main plate 44.

The cutting blades 69 and 70 are normally held in their spaced apart or open position, as shown in FIGS. 5 and 8, by a conventional air cylinder 78 that is supported by the plate 76. This permits the gripping fingers 48 to pass between the blades and withdraw selected pill strips. When the blades are in their spaced apart position, the upper blade carrying bar 71 bears against the underside of the carriage main plate 44 and the lower blade carrying bar 72 bears against the U-shaped plate 76.

After the gripping fingers have grasped a selected pill strip and withdrawn one or more pills, the air cylinder 78 operates in a substantially conventional manner to move the blades together whereby the pills that have been withdrawn are severed from the remainder of the pill strip. The severed pills drop down onto the conveyor belt 22, FIGS. 1, 3 and 4, for delivery by the belt to the receiving station 31. As the severed pills drop they are directed toward the conveyor belt by inclined surfaces 80, FIGS. 5 and 8, on the lower blade carrying bar 72 and an inclined surface 81 on a supplemental bar 82.

As best shown in FIGS. 3 and 4, the conveyor belt 22 extends across all four of the dispensing units 20, the upper reach of the belt being spaced below the racks 35 as shown in FIG. 4. The belt passes around a power drum 83 driven by a motor 84 at one end and around a take-up drum 85 at its other end.

PATIENT TRAY FEED

As noted previously, pills delivered by the conveyor belt to the receiving station 31 are deposited in an individual patient tray 21, FIGS. 1 and 3, which is then moved on to the inspection station 24. Stacks of the trays 21 are stored in storage area 30, FIG. 1, and the top tray of one of the stacks 21A is at the same level as, and in alignment with, a horizontal tray track 86 leading to the inspection station. The top tray referred to is adapted to be moved along the track 86 by a retractable pusher unit 87, FIGS. 1 and 2, supported by a pusher carriage indicated generally at 88 in FIG. 2, the carriage to be described in greater detail hereinafter.

Figure 2:
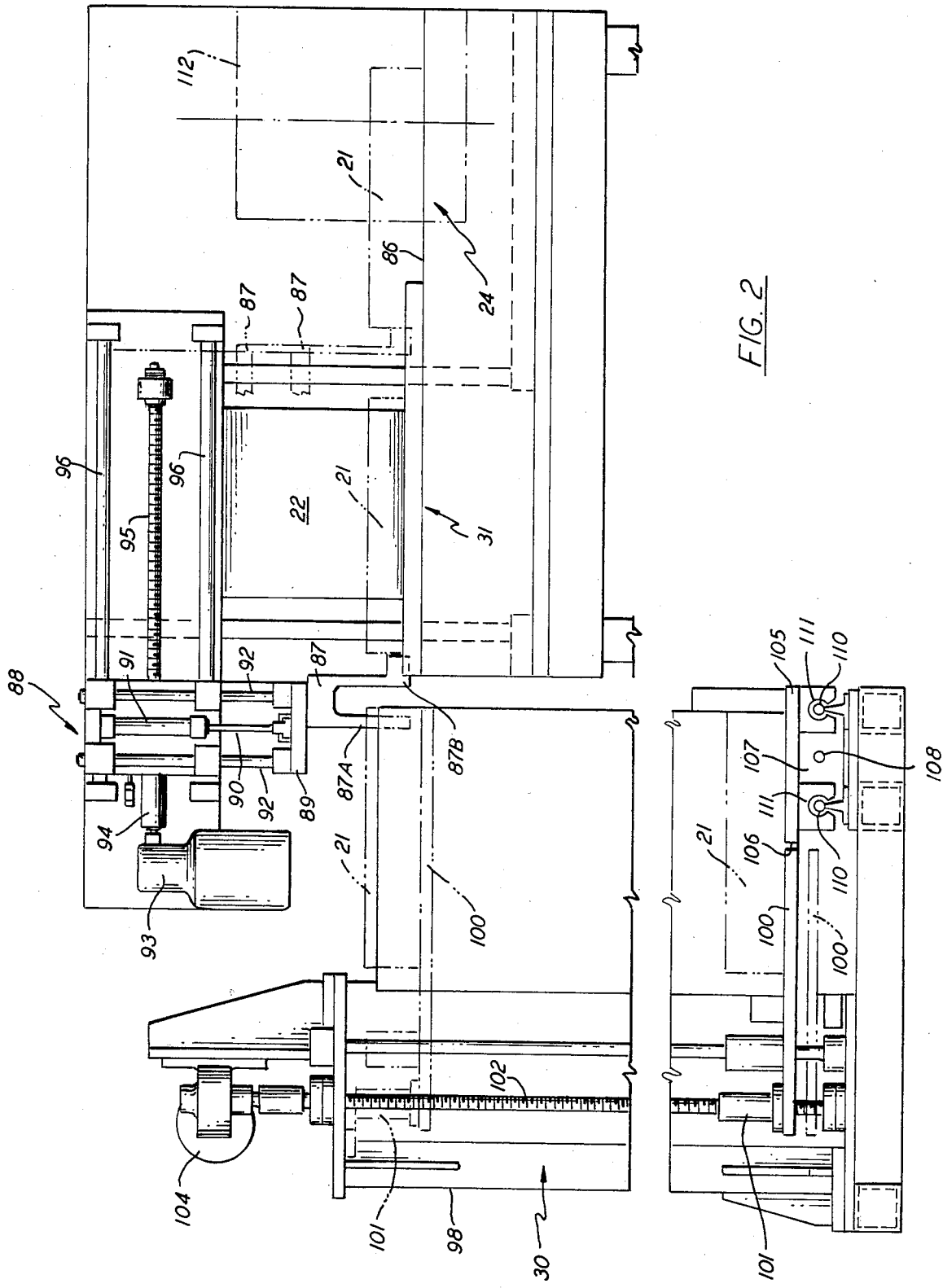
FIG. 2 is a vertical sectional view taken substantially along line 2—2 of FIG. 1.

The pusher unit 87 has the general shape of an inverted U, and on its working stroke moves from left to right as viewed in FIGS. 1 and 2. The back leg 87A of the pusher unit is arranged to engage the leading end of the top tray 21 as shown in FIG. 1 and move it from its stack to the receiving station 31. At the same time, the front leg 87B of the pusher unit engages the trailing end of a tray that has already been filled at the receiving station and moves it to the inspection station 24.

Movement of a pair of trays to new stations as above described actuates a limit switch (not shown) that causes the pusher unit 87 to move upwardly until it is clear of the trays. To this end, the unit is connected at its upper end to a plate 89, FIG. 2, that is in turn connected through a rod 90 to a conventional air cylinder 91 mounted on the pusher carriage 88. Guide rods 92 coact up the rod 90 to insure vertical movement of the pusher unit 87 without rotation.

At the termination of the upward movement of pusher unit 87, another limit switch (not shown) is actuated which causes the carriage 88 with its pusher unit 87 to be moved from right to left back to its starting position shown in FIGS. 1 and 2. Horizontal movement of carriage 88 and attached pusher unit 87 is affected by a drive motor 93 that is connected by a coupling 94 to a ball screw 95. The ball screw engages a ball nut (not shown) mounted on the carriage 88 whereby rotation of the screw causes horizontal movement of the carriage, the carriage being guided in such movement by horizontal guide rods 96. The drive motor 93 and the ends of the rods 96 are secured to suitable fixed structure (not shown) located inside an elongated horizontal housing 97, FIG. 1, that projects from the upper end of a vertically disposed, hollow stanchion 98 forming a part of the dispensing unit.

Movement of the carriage 88 back to its starting position, FIGS. 1 and 2, as described above actuates another limit switch (not shown) that causes the entire stack 21A of trays to be moved upwardly a distance equal to the height of one tray whereupon the top tray of the stack is again level with the tray track 86 and ready to be moved to the right to receiving station 31. When the top tray reaches the level of the track 86 a further limit switch causes the pusher unit 87 to be lowered so that its leg 87A is in position to push the top tray and leg 87B is in position to push the tray at the receiving station. The tray feed cycle is then ready to begin again.

The mechanism for intermittently elevating the stack of trays 21A is shown in FIGS. 1 and 2 includes a lift arm 100 that is positioned below the bottom tray as indicated in FIG. 1. Lift arm 100 is connected at one end to a ball nut 101, FIG. 2, that is engaged by a ball screw 102. The ball screw can be rotated in either direction by a ball screw motor 104. The motor 104 rotates the ball screw on command to move the stack of trays 21A upwardly a distance equal the height of one tray following each movement of the top tray in the stack to the receiving station 31.

After the last tray in the stack has been advanced to the receiving station, the motor 104 will be actuated by a suitable limit switch or the like to rotate the ball screw in the reverse direction until the lift arm 100 is moved down to its lowermost position shown in phantom lines in FIG. 2. A substantial number of trays 21 can be stored in a plurality of stacks in the storage area 30, FIG. 1, and these stacks are positioned on a horizontally movable carriage 105. After the stack of trays 21A, for example, has been depleted and the lift arm 100 has been moved down to its lowermost position below the carriage as shown in FIG. 2, the carriage will be moved one tray increment to the right as viewed in FIG. 1 to bring a new stack of trays into alignment with the horizontal tray track 86.

It may be seen from FIGS. 1 and 2 that the tray carriage 105 is provided with a plurality of spaced recesses 107 that are dimensioned so as to receive the outer part of the lift arm 100 with a clearance fit. After the carriage has been moved to position a new stack of trays in alignment with the tray track 86, the arm is raised up into the recess beneath the stack to intermittently elevate the stack as previously described.

The mechanism for horizontally moving the tray carriage 105 includes a ball nut 107 secured to the underside of the carriage, FIG. 2, and a ball screw 108 in engagement with the ball nut. The screw can be rotated in either direction by a suitable ball screw motor (not shown) to cause the carriage movement, this movement being guided by guide rods 110 that are engaged by bearing sleeves 111 secured to the bottom of the carriage.

When the last tray 21 in the last stack of trays has been moved to the receiving station 31, a warning light (not shown) will come on to advise an operator that the storage area 30 must be re-supplied with stacks of trays. At this time, the tray carriage 105 may have been moved all the way to the right as viewed in FIG. 1 in which case the replacement stacks of trays can be loaded onto the carriage in this position (See FIG. 3). The carriage movement will then be from right to left to bring the successive tray stacks into alignment with the tray track 86.

OPERATION

The operation of the medication dispensing apparatus can be summarized as follows. At the outset, the prescription requirements for all of the patients are keypunched or otherwise entered into the computer control system for the apparatus. At this time, it may be assumed that the pill bins 37 are loaded with pill strips, that the storage area 30 is supplied with stacks of trays 21 and that an empty tray is positioned at the receiving station 31 as shown in FIG. 1. At any time after the prescription requirements have been entered into the control system, the apparatus can be activated and the pill dispensing carriage assemblies 42 will be selectively moved as programmed to simultaneously dispense from one or more of the dispensing units 20 the pills required for the first prescription to be filled. Because the pill strips will have been positioned in precise, predetermined locations in the dispensing units, the dispensing carriage assemblies will know to which locations they should advance. The pills dispensed for the prescription will drop substantially simultaneously onto the conveyor belt 22 which may run continuously during operation of the apparatus or may be activated only after all of the pills for a particular prescription have been deposited on the belt.

When the pills on the belt have been deposited in the tray waiting at the receiving station 31, the pusher unit 87 will move the filled tray to the inspection station 24 and at the same time advance the empty top tray of the tray stack 21A to the receiving station to await the next prescription. At the inspection station there is a CRT display 112, and the display that appears will be synchronized with the arrival of the patient tray at the station.

The inspection station will be attended by a pharmacist who will compare the pills in the tray with the prescription shown in the display, the display information having been derived from the information originally entered into the computer control system. Preferably, the original handwritten doctor's prescription will also appear as a double check in making the comparison.

The CRT display may show that additional medications not handled by the dispensing apparatus are required in which case these will be manually added to the tray by the pharmacist. In addition to displaying the particular patient prescription, the equipment at the inspection station will print out the prescription and patient identification data on a label which will be attached to the tray.

The remaining prescriptions will be individually dispensed and compared in the same manner until all of the prescriptions have been filled. It is contemplated that the control system will have the capability of analyzing drugs in a particular prescription for possible harmful interaction and also for known patient allergies. The control system will also have the capability of maintaining inventory and billing functions.

From the foregoing description it will be apparent that the invention disclosed herein provides a novel and very advantageous medication dispensing apparatus. As will be understood by those familiar with the art, the invention may be embodied in other specific forms without departing from the spirit or essential characteristics thereof.

I claim:

1. Medication dispensing apparatus comprising a vertical rack for storing a substantial number of elongated pill strips one above the other, each pill strip having a row of pills mounted thereon in spaced relation to one another, a vertically movable carriage for the rack having means for grasping an exposed edge of a pill strip and withdrawing a portion of it from the rack to expose a predetermined number of pills, the carriage being selectively movable with respect to the rack to position its grasping means opposite a predetermined pill strip, cutting means on the carriage for cutting the pill strip so that the exposed pill or pills are severed therefrom, conveyor means positioned with respect to the vertical rack so that the severed pills fall on to it, a receptacle for receiving the severed pills, the conveyor means being operable to deposit the pills in the receptacle, an inspection station forming a part of the medication dispensing apparatus, and means for automatically moving the receptacle to the inspection station after the pills have been deposited therein.

2. Apparatus as defined in claim 1 wherein the vertical rack is arranged to support a plurality of removable bins one above the other, each bin having means for supporting the opposite longitudinal edges of the pill strips.

3. Apparatus as defined in claim 2 wherein the bins are substantially rectangular in shape and are open on their front sides to expose the front edges of the pill strips to the carriage grasping means.

4. Apparatus as defined in claim 1 wherein there are a plurality of pill receiving receptacles, the apparatus including means for moving the receptacles along a substantially horizontal path from a storage area to a pill receiving station and from thence to the inspection station, the means for moving a receptacle from the receiving station to the inspection station being operable at the same time to move another receptacle from the storage area to the receiving station.

5. Apparatus as defined in claim 4 wherein the receptacles in the storage area are arranged in vertically stacked relation to one another, the uppermost receptacle being in horizontal alignment with said horizontal path of movement.

6. Apparatus as defined in claim 5 wherein the stacked receptacles in the storage area are positioned on a vertically movable lift arm, the arm being operable to move the receptacle stack upwardly a distance equal to the height of one receptacle when the uppermost receptacle is moved from the storage area to the receiving station.

7. Medication dispensing apparatus comprising a plurality of vertical racks each of which is adapted to store a substantial number of elongated pill strips one above the other, each pill strip having a row of pills mounted thereon in spaced relation to one another, a single vertically movable carriage having for each rack a means for withdrawing a portion of an individual pill strip from the rack to expose a predetermined number of pills, the carriage being selectively movable with respect to the racks to position the withdrawing means opposite a predetermined pill strip in one of the racks, cutting means on the carriage for cutting pill strips that have been withdrawn so that the exposed pill or pills are severed therefrom, conveyor means positioned with respect to the racks so that the severed pills fall on to it, and a plurality of receptacles for receiving the severed pills, the conveyor means being operable to deposit the pills in the receptacles.

8. Apparatus as defined in claim 7 wherein each vertical rack is arranged to support a plurality of removable bins one above the other, each bin having means for supporting the opposite longitudinal edges of the vertically stacked pill strips.

9. Apparatus as defined in claim 8 wherein the bins are substantially rectangular in shape and are open on their front sides to expose the front edges of the pill strips to the carriage withdrawing means.

10. Apparatus as defined in claim 7 together with an inspection station forming a part of the medication dispensing apparatus, the apparatus including means for moving the receptacles along a substantially horizontal path from a storage area to a pill receiving station and from thence to the inspection station, the means for moving a receptacle from the receiving station to the inspection station being operable at the same time to move another receptacle from the storage area to the receiving station.

11. Apparatus as defined in claim 10 wherein the receptacles in the storage area are arranged in vertically stacked relation to one another, the uppermost receptacle being in horizontal alignment with said horizontal path of movement.

12. Apparatus as defined in claim 11 wherein the stacked receptacles in the storage area are positioned on a vertically movable lift arm, the arm being operable to move the receptacle stack upwardly a distance equal to the height of one receptacle when the uppermost receptacle is moved from the storage area to the receiving station.

13. Medication dispensing apparatus comprising a plurality of vertical racks each of which is adapted to store a substantial number of elongated pill strips one above the other, each pill strip having a row of medication units fastened thereto in spaced relation to one another, a single vertically movable carriage including a pair of horizontally movable gripping fingers for each rack, the carriage being selectively movable relative to the racks to position the gripping fingers for a given rack opposite a preselected pill strip in that rack, the fingers being movable towards and away from the rack and being operable to grasp an exposed edge of the preselected pill strip and move it so that one or more medication units are withdrawn from the rack, cutting means on the carriage for cutting the preselected strip so that the medication units that were withdrawn are severed from the strip, an inspection station forming a part of the medication dispensing apparatus, and means for automatically transporting the medication units that were severed from the pill strip to said station.

14. Apparatus as defined in claim 13 wherein each vertical rack is arranged to support a plurality of removable bins one above the other, each bin having means for supporting the opposite longitudinal edges of the pill strips.

15. Apparatus as defined in claim 14 wherein the bins are substantially rectangular in shape and are open at their front sides to expose the front edges of the pill strips to one of the pairs of carriage gripping fingers.

16. Apparatus as defined in claim 13 wherein the vertical racks are disposed in a row in side by side relation, a portion of the movable carriage being wide enough to span the racks, each pair of gripping fingers on the carriage being vertically aligned with one of the racks.

17. Apparatus as defined in claim 13 including conveyor means positioned with respect to the vertical racks so that the severed medication units fall on to it, a receptacle for receiving the severed medication units, a storage area for the receptacle, and a receiving station located adjacent one terminus of the conveyor means where medication units on the conveyor means can be deposited in the receptacle, the means for automatically transporting medication units to the inspection station including means for moving the receptacle from the storage area to the receiving station.

18. Apparatus as defined in claim 17 wherein there are a plurality of medication unit receiving receptacles, the receptacles being moved along a substantially horizontal path from the storage area to the receiving station and from thence to the inspection station, the means for moving a receptacle from the receiving station to the inspection station being operable at the same time to move another receptacle from the storage area to the receiving station.

19. Medication dispensing apparatus comprising a plurality of vertical racks arranged in a row in side by side relation to one another, a plurality of bins removably mounted in each rack one above the other, each bin having means for storing a substantial number of elongated pill strips one above the other, each pill strip having a row of pills fastened thereto in spaced relation to one another, a single vertically movable carriage positioned adjacent the front of the vertical racks, the carriage including a pair of horizontally movable gripping fingers for each rack, the carriage being selectively movable relative to the racks to position the gripping fingers for a given rack opposite a preselected pill strip in that rack, the fingers being movable towards and away from the rack and being operable to grasp an exposed edge of the preselected pill strip and move it so that one or more pills are withdrawn from the rack, cutting means on the vertically movable carriage for cutting the preselected strip so that the pills that were withdrawn from the rack are severed from the strip, conveyor means positioned with respect to the racks so that the severed pills fall onto it, a storage area forming a part of the dispensing apparatus, a plurality of pill receiving receptacles stored in the storage area, a receiving station adjacent one terminus of the conveyor means where pills on the conveyor can be deposited in a receptacle, an inspection station, and means to move a receptacle along a substantially horizontal path from the storage area to the receiving station and from thence to the inspection station, the means for moving a receptacle from the receiving station to the inspection station being operable at the same time to move another receptacle from the storage area to the receiving station.

20. Apparatus as defined in claim 19 wherein the receptacles in the storage area are arranged in vertically stacked relation to one another, the uppermost receptacle being in horizontal alignment with said horizontal path of movement.

21. Apparatus as defined in claim 20 wherein the stacked receptacles in the storage area are positioned on a vertically movable lift arm, the arm being operable to move the receptacle stack upwardly a distance equal to the height of one receptacle when the uppermost receptacle is moved from the storage area to the receiving station.

22. Apparatus as defined in claim 19 wherein the apparatus includes at least one dispensing unit comprised of four vertical racks, the row of racks being arranged so that there is a space between the second and third racks, a portion of the vertically movable carriage being positioned in said space and another portion spanning the racks adjacent the front sides thereof, the pairs of gripping fingers being mounted on the last-named carriage portion in vertical alignment with their respective racks.

* * * * *